3,470,429
SYSTEM FOR ALIGNING REMOTE LINES OF POSITION
Raymond Wendell Goodwin, Westport, and Marshall Greenspan, Fairfield, Conn., assignors to United Aircraft Corporation, East Hartford, Conn., a corporation of Delaware
Filed Jan. 6, 1966, Ser. No. 519,022
Int. Cl. H02p 5/46, 7/68, 7/74
U.S. Cl. 318—18                                                    15 Claims

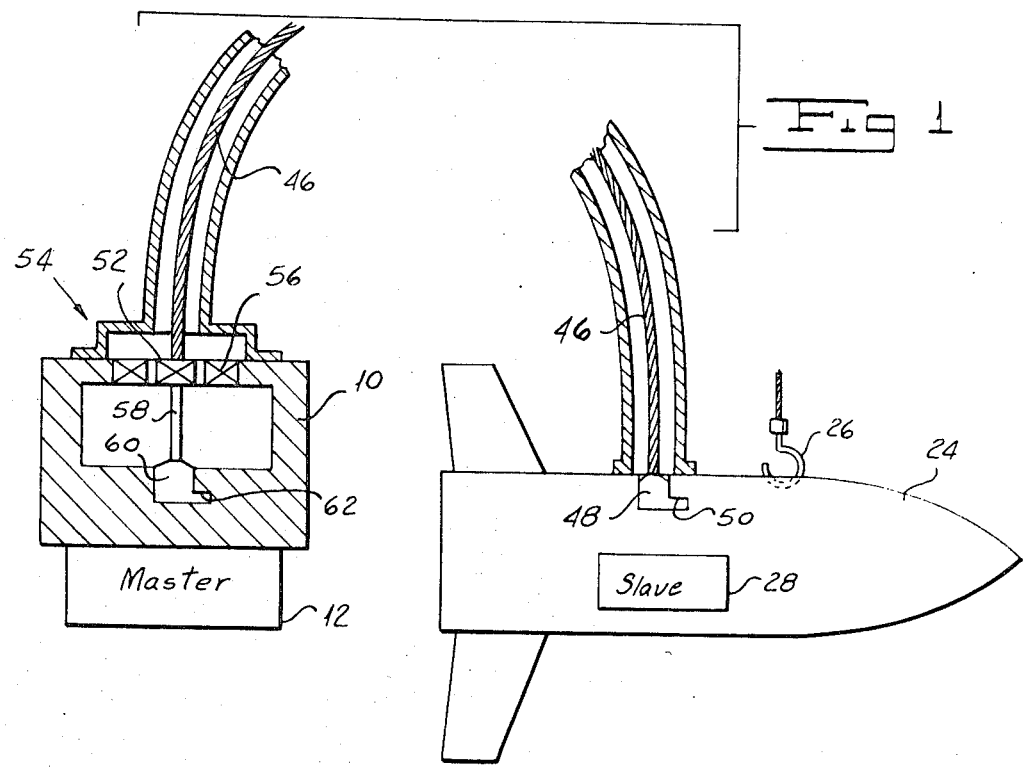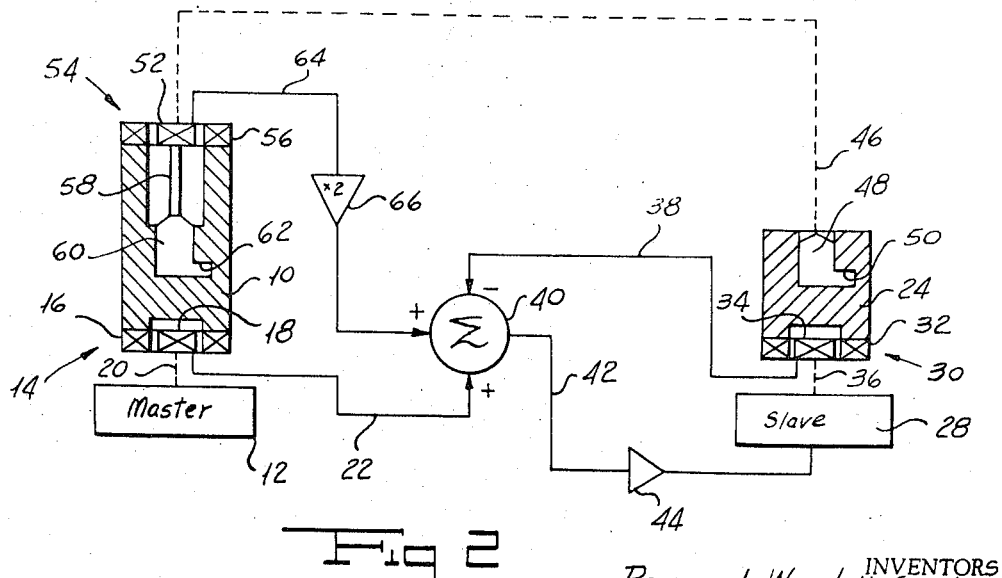

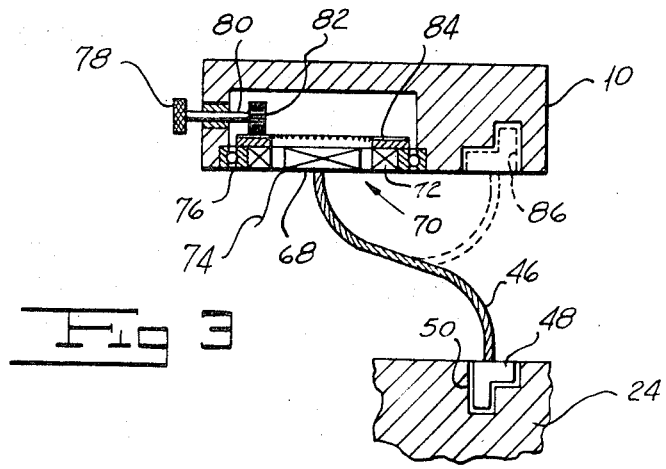
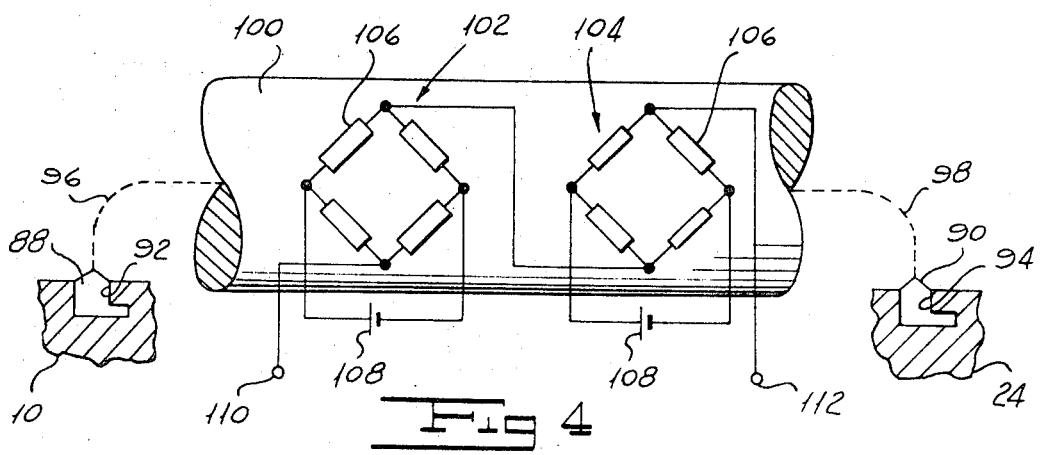
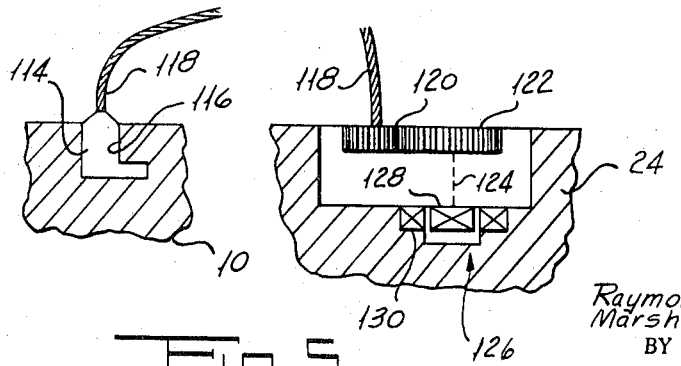
INVENTORS
Raymond Wendell Goodwin
Marshall Greenspan

United States Patent Office 3,470,429
Patented Sept. 30, 1969

ABSTRACT OF THE DISCLOSURE

A servo system especially adapted for aligning remote lines of position in which respective transducers have rotors and stators mounted on bodies adapted to move relative to each other. A comparator responsive to respective signals representing the displacements of the rotors from reference positions with relation to the stators actuates means for positioning the stator of one of the transducers. Means responsive to relative movement between the stators in response to movement of the bodies from a predetermined relative position provides a compensating signal which is fed to the comparator to compensate for the relative movement of the bodies.

---

Our invention relates to a system for aligning remote lines of position and, more particularly, to a system for aligning in a simple and expeditious manner two lines of position provided on bodies which may move relative to each other.

In many instances it is required that one line of position be aligned with another line of position which may, for example, be provided by a master system. If the coordinate systems for both lines are connected by a rigid mechanical member, the two lines can be aligned with relative ease. If, however, the possibility exists that one of the coordinate systems may move unpredictably with relation to the other, the problem of aligning the two lines becomes relatively complicated.

One situation wherein two lines of position on respective bodies must be aligned is that in which a missile or the like is to be launched from a moving carrier. Customarily the carrier is provided with navigation equipment which is of high accuracy and which is used as a reference for the secondary inertial system in the vehicle to be launched. It will be appreciated, moreover, that it is desirable that the secondary system be aligned as rapidly as is possible prior to launching. Owing to the fact that there is usually relative motion between the vehicle to be launched, such as a missile, and the carrier supporting the master system, this relative motion must be taken into account in aligning the slave system to the master system.

Various techniques have been employed in the prior art to achieve alignment of the secondary system. One technique which has been employed is optical alignment, which involves the use of mirrors and precision light sources. It has also been proposed that mechanical alignment be achieved utilizing angle indicators, such as synchros and resolvers, for comparing the deflection of the respective gimbal axes of the two systems. It will readily be appreciated that both these systems are relatively complex.

We have invented a system for aligning remote lines of position which takes into account relative motion between the bodies on which the lines of position are provided. Our system accomplishes the alignment of the two lines of position in a simple, rapid and expeditious manner. It does not require relatively complicated optical arrangements.

One object of our invention is to provide a system for aligning two remote lines of position in a rapid and expeditious manner.

Another object of our invention is to provide a system for aligning two remote lines of position while accounting for relative movement of the bodies on which the lines are provided.

A further object of our invention is to provide a system for aligning remote lines of position which does not require complicated optical apparatus.

Other and further objects of our invention will appear from the following description.

In general our invention contemplates the provision of a system for aligning the lines of position of respective bodies which may shift relative to each other in which we generate a first signal representing the displacement of one body carrying the master with respect to the direction to which the master system is aligned, a second signal representing the displacement of the body carrying the slave system with respect to the direction to which the slave system is oriented, a third signal representing the relative displacement of the two bodies and provide means responsive to the three signals for orienting the slave system direction to the master system direction.

In the accompanying drawings which form part of the instant specification and which are to be read in conjunction therewith and in which like reference numerals are used to indicate like parts in the various views:

FIGURE 1 is a schematic view of one form of our system for aligning two lines of position.

FIGURE 2 is a schematic view illustrating the mode of operation of the form of our system shown in FIGURE 1.

FIGURE 3 is a fragmentary schematic view of an alternate form of our system for aligning remote lines of position.

FIGURE 4 is a schematic view of a further form of our system for aligning lines of position.

FIGURE 5 is a schematic view of yet another form of our system for aligning lines of position.

Referring now to FIGURES 1 and 2 of the drawings, a first body 10 which may, for example, be a carrier from which the vehicle is to be launched, is provided with a stabilized system 12 which, as is known in the art, may be oriented to any given direction. In describing our system, for purposes of illustration and to avoid complications, we will describe it only in connection with azimuth. So considered, the master system 12 may be aligned to north, for example. A synchro indicated generally by the reference character 14 and comprising a stator 16 carried by the body 10 and a rotor 18 supported by a shaft 20 connected to the master system 12 is adapted to provide an output signal on a channel 22, which signal represents the azimuth orientation of the body 10 with respect to the direction, north, to which the master is aligned.

The body or carrier 10 may support a second body, such as a missile 24, in any suitable manner known to the art. Schematically, we have indicated the connection between the body 24 and the body 10 by means of a hook 26. It will readily be appreciated that some relative movement between the body 24 and the body 10 around the azimuth axis may take place in an unpredictable manner.

We provide the body 24 with a slave inertial system 28 which is to be aligned with the master system 12 prior to launching of the missile 24. The body 24 carries a synchro, indicated generally by the reference character 30, comprising a rotor 34 and a stator 32 connected by a shaft 36 to the slave system 28. As is known in the art, the slave system 28 comprises an azimuth gyro providing a line of position and adapted to be precessed in response to a torquing signal applied to the slave system 28 to orient the line of position provided thereby. The rotor 34 of synchro 30 provides an output signal on a channel 38 representing the orientation in azimuth of the body 24 with respect to the line of position or direction to which the slave system 28 is oriented.

We apply the signal on channel 22 and the signal on channel 38 to a network 40 to provide an output signal on channel 42 representing the difference between the signals on channels 22 and 38. In operation of our system thus far described, and assuming that the body 24 is oriented in azimuth to the direction of the body 10, the signal on channel 42 will be a measure of the deviation of the line of position provided by system 28 from the direction to which the master system is oriented. In the particular situation under consideration, the signal on channel 42 represents the deviation of the line of position provided by the system 28 from north. We employ an amplifier 44 to apply the signal on channel 42 to the system 28 as an azimuth gyro torquing signal. In response to that signal the line of position provided by system 28 will be oriented toward north until the signal on channel 38 equals the signal on channel 22 and the output signal on channel 42 disappears.

As has been pointed out hereinabove, the possibility exists that the body 24 will move unpredictably in azimuth with respect to the body 10. It will readily be understood that with the system thus far described, if that occurs, then the output signal on channel 42 will no longer truly represent the deviation of the line of position of the system 28 from the reference direction provided by the master 12. Our system is so arranged as to compensate for any relative movement of the bodies 24 and 10 around the azimuth axis from a predetermined position to ensure that the signal on channel 42 is always a true representation of the deviation of the line provided by system 28 from the reference direction.

In one form of our arrangement illustrated in FIGURES 1 and 2, we connect one end of a flexible cable 46 to the body 24 with a predetermined orientation of the cable end in azimuth by any suitable means such, for example, as a key 48 inserted in a slot 50 in body 24. We connect the other end of cable 46 to the rotor 52 of a synchro, indicated generally by the reference character 54, having a stator 56 carried by body 10. A flexible shaft section 58 connects the rotor 52 to another key 60 inserted in a slot 62 in the body 10. We so orient the slots 50 and 62 that with bodies 24 and 10 aligned and with the keys in the slots, cable 46 and shaft 58 have substantially zero twist. If body 24 moves in azimuth relative to the body 10, cable 46 twists to cause rotor 52 to move relative to stator 56. Preferably we construct the shaft section 58 to have a spring rate which is half that of the cable 46 so that the rotor 52 produces an output signal on a channel 64 representing about half the cable twist. We employ an amplifier 66 having a gain of about two for applying the signal on channel 64 to network 40 in such a sense as to add with the signal on channel 22. As will be explained hereinafter, the input to network 40 from amplifier 66 is a measure of the relative rotary displacement between bodies 24 and 10.

Referring now to FIGURE 3, we have shown an alternate embodiment of our invention wherein one end of the cable 46 carries a key 48 adapted to be inserted in a slot 50 in body 24 as in the form of our invention shown in FIGURES 1 and 2. In this embodiment, we connect the other cable end to the rotor 68 of a synchro indicated generally by the reference character 70, but do not employ any flexible shaft portion 58. In response to the twisting of cable 46, rotor 68 turns with respect to the stator 72 and the rotor 68 produces an output signal on a channel 74. In this form of our invention, the signal on channel 74 is a displacement signal rather than being a measure of cable twist. It also, however, represents the relative rotary displacement of bodies 10 and 24 with respect to the azimuth axis. The form of our system shown in FIGURE 3 is provided with an arrangement for zeroizing the synchro 70 in a predetermined position of the cable end carrying the key 48. We rotatably mount stator 72 on body 10 by means of a bearing 76. A knob 78 is adapted to be actuated to rotate a shaft 80 to cause a pinion gear 82 to drive a ring gear 84 secured to the stator 72 for movement therewith. We provide the body 10 with a slot 86 oriented to a direction corresponding to that of slot 50 when the bodies 10 and 24 are aligned. To zeroize this system we insert key 48 in slot 86 and then rotate stator 72 until the signal produced by rotor 68 on channel 74 substantially disappears. Having thus zeroized the synchro, we then insert key 48 into the missile slot 50 and the system operates as before.

Referring to FIGURE 4, in yet another form of our invention, we insert respective keys 88 and 90 in aligned slots 92 and 94 in the body 10 and in the body 24. Keys 88 and 90 are carried by the respective ends indicated schematically by the broken lines 96 and 98 of the flexible connecting cable 100, a portion of which is shown greatly enlarged in FIGURE 4. In this form of our invention we measure the twist of the cable 100 throughout its length by any convenient means known to the art such, for example, as a plurality of strain gauges, two of which are indicated generally by the reference characters 102 and 104, at spaced positions along the length of the cable 100. Each of the gauges 102 and 104 includes four resistance arms 106 which are so arranged as to eliminate stress due to bending. Suitable sources of potential such as batteries 108 are provided for the gauges. We add the outputs as indicated by the terminals 110 and 112 to derive a signal which is a measure of twist in the cable 100. The arrangement we have shown is a highly sensitive temperature compensated arrangement for affording a measure of twist. It will be understood that alternatively to the particular arrangement shown in FIGURE 4, we might construct the entire flexible shaft 100 as a strain gauge and measure strain in an electrical bridge circuit. The arrangement of FIGURE 4 obviates the problem of whether or not a flex sampling section is representative.

Referring to FIGURE 5 in a still further form of our invention, we insert a key 114 in a slot 116 in the body 10. Key 114 is carried by one end of a flexible shaft or cable 118, the other end of which is connected to an input gear 120 which drives a gear 122 on the shaft 124 of a synchro indicated generally by the reference character 126 on the body 24. In response to twist of the cable, gears 120 and 122 drive the rotor 128 of the synchro 126 relative to the synchro stator 130 to cause the rotor to produce an output signal which is representative of twist of the cable 118. This geared arrangement decreases errors resulting from synchro resolution.

In operation of any one of our systems described above, we first place the keys such, for example, as keys 48 and 50 in the aligned slots or keyways so that there is substantially no twist in the cable 46. Under these conditions, ultimately the signal on channel 22 is equal to the signal on channel 38 and there is no output signal on channel 42. Thus, with the bodies 10 and 24 properly oriented relative to each other, the platform 28 will be oriented to the same direction as is the master platform 12. Should any relative rotary displacement of bodies 10 and 24 take place in azimuth, cable 46 will twist to cause rotor 52 to rotate relative to stator 56 to produce an output signal which is a measure of cable twist. In the particular embodiment of FIGURE 1, we construct the flex sampling section 58 to have a spring rate which is equal to the spring rate of cable 46. In order to apply the correct compensating signal, amplifier 66 multiplies the synchro output by 2 to provide such a compensating signal for network 40 as to account for the change in signal on channel 38 resulting from the rotation of body 24 with respect to the platform 28. The compensating signal produced in the other particular forms of our arrangement is utilized in an analogous manner to compensate for relative rotary movement of the bodies in azimuth. While we have described our system only in connection with one axis, it will readily be appreciated that it is equally applicable to other axes.

It will be seen that we have accomplished the objects of our invention. We have provided a system for aligning remote lines of position in a rapid and expeditious manner. Our system compensates for relative movement of the bodies around an axis with reference to which the lines of position are provided. It does not require a complicated optical apparatus.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. Apparatus for aligning lines of position on respective bodies adapted to move relative to each other around an axis including in combination, a first stabilized platform on one of said bodies, said first stabilized platform providing a reference line of position oriented to a predetermined direction with reference to said axis, means for producing a first electrical signal representing the orientation of said one body with respect to said direction, a second stabilized platform on the other body, said second stabilized platform providing a second line of position and including signal responsive means for orienting said second line of position with reference to said axis, means providing a second signal representing the orientation of said second body with reference to said second line of position, means responsive to displacement of said bodies from a predetermined relative position around said axis for producing a third signal representing said displacement, means responsive to said first and second and third signals for producing a fourth signal representing the deviation between said reference line and said second line and means for applying said fourth signal to said orienting means.

2. Apparatus as in claim 1 in which said third signal producing means comprises a flexible cable extending between said bodies.

3. Apparatus as in claim 1 in which said third signal producing means comprises a flexible cable secured at one end to one of said bodies, a synchro having a rotatable element carried by the other of said bodies and means connecting the other cable end to said synchro element.

4. Apparatus as in claim 1 in which said orienting means is constructed and arranged to add said first and third signals and to substract said second signal.

5. Apparatus as in claim 1 in which said third signal producing means is a flexible cable secured at its ends to said bodies and strain gauges along the length of said cable.

6. Apparatus as in claim 1 in which said third signal producing means comprises a flexible cable, means for securing one end of said cable to one of said bodies in a predetermined angular orientation, a synchro having a rotor carried by the other of said bodies, means connecting the other end of said cable to said rotor, a flexible shaft section, means connecting one end of said shaft section to said rotor and means connecting the other end of said shaft section to said other body in a predetermined angular position of said shaft corresponding to the orientation of said cable end at said other body.

7. Apparatus as in claim 6 in which said shaft section has a spring rate half that of said cable.

8. Servo apparatus for translating angular displacement from a first body to a second body adapted to move with relation to said first body from a predetermined relative position including in combination, a first transducer comprising a first stator and a first rotor, said first transducer providing a first signal representing the displacement of said first rotor from a reference position with relation to said first stator, means mounting said first stator on said first body, a second transducer comprising a second stator and a second rotor, said second transducer providing a second signal representing the displacement of said second rotor from said second stator, means mounting said second stator on said second body, means for comparing said first and second signals, means responsive to said comparing means for orienting said second rotor, means for producing a third signal in response to relative movement of said stators as said bodies move relative to each other from said predetermined position, and means for applying said third signal to said comparator to compensate for said relative movement.

9. Apparatus as in claim 8 in which said third signal producing means comprises a flexible cable.

10. Apparatus as in claim 8 in which said third signal producing means comprises a flexible cable, means securing one end of said cable to one of said bodies and means carried by the other body for producing said third signal in response to rotary displacement of said cable.

11. Apparatus as in claim 8 in which said third signal producing means comprises a flexible cable, and means securing the ends of said cable to the respective bodies with substantially no twist in said cable at said predetermined position of said bodies.

12. Apparatus as in claim 11 including means for measuring the twist in said cable in response to relative movement of said bodies from said predetermined position.

13. Apparatus as in claim 8 in which said third signal producing means comprises a device including a third rotor and a third stator for producing said third signal, means mounting said third stator on said one body, a flexible shaft connecting said third rotor to said one body, a flexible cable connected to said third rotor and means so connecting said cable to said other body that said device produces substantially no output signal in said predetermined relative position of said bodies.

14. Apparatus as in claim 8 in which said third signal producing means comprises a flexible cable, means for securing the ends of said cable to the respective bodies with substantially no twist in said cable at said predetermined position of said bodies and means along the length of said cable for generating a signal to measure the twist in said cable.

15. Apparatus as in claim 8 in which said third signal producing means comprises a device having a third rotor and a third stator for producing said third signal, means mounting said device on said one body, a flexible cable connected at one end to said third rotor, means on said one body for orienting the other end of said cable remote from said rotor to a predetermined angular position, means for adjusting said device to produce substantially no output signal in said position of said cable other end and means on said other body for orienting said cable other end to said predetermined angular position.

References Cited

UNITED STATES PATENTS

| 2,590,845 | 4/1952 | Curry. | |
| 2,700,106 | 1/1955 | Taylor | 318—24 XR |
| 2,789,231 | 4/1957 | Dumer | 318—24 XR |
| 3,209,223 | 9/1965 | Scheib. | |

B. DOBECK, Primary Examiner

U.S. Cl. X.R.

318—24